July 15, 1969          J. J. PIERRO          3,456,136
LINEAR ELECTRIC MOTOR
Filed Sept. 26, 1966          2 Sheets-Sheet 1
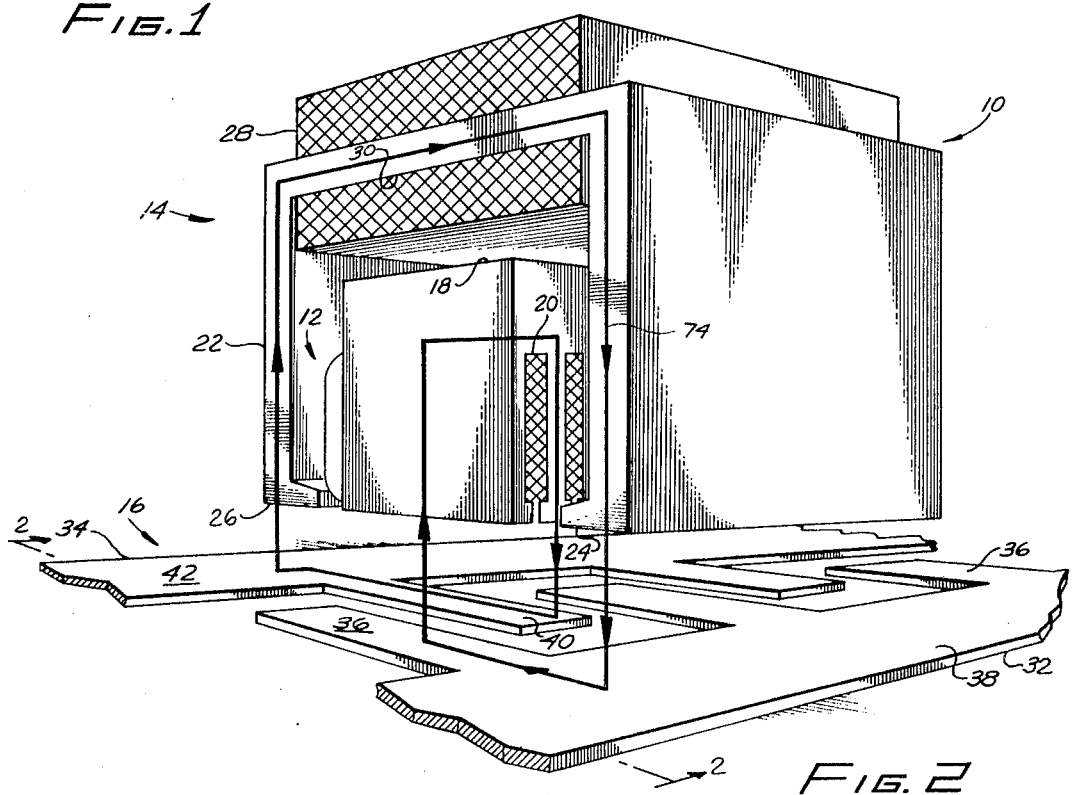
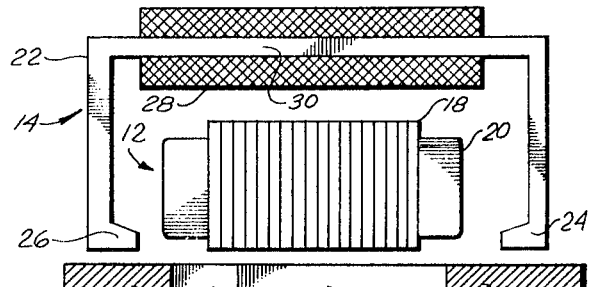
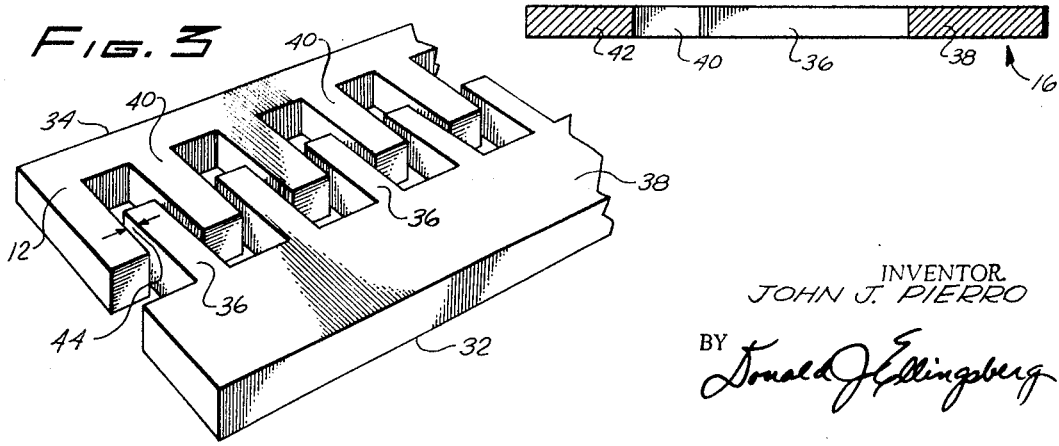
INVENTOR
JOHN J. PIERRO
BY Donald J. Ellingsberg July 15, 1969   J. J. PIERRO   3,456,136
LINEAR ELECTRIC MOTOR
Filed Sept. 26, 1966   2 Sheets-Sheet 2
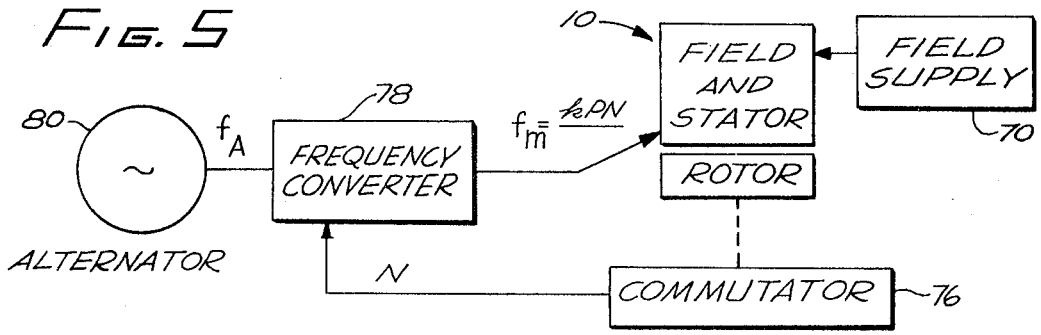
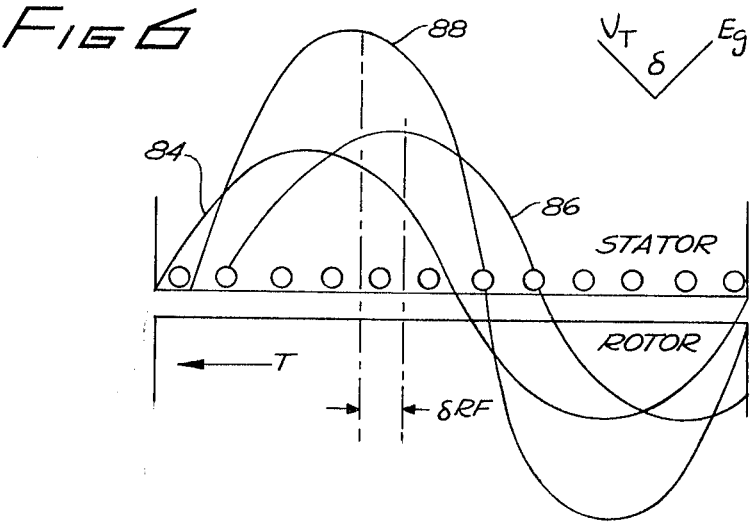
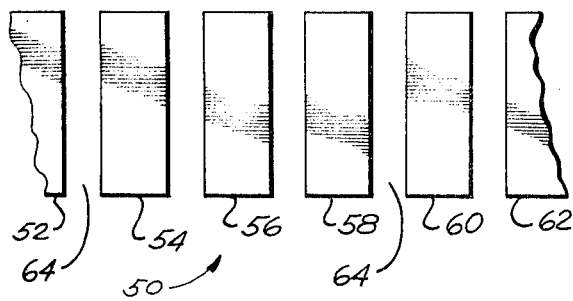
INVENTOR.
JOHN J. PIERRO
BY Donald J. Ellingsberg

United States Patent Office 3,456,136
Patented July 15, 1969

3,456,136
LINEAR ELECTRIC MOTOR
John J. Pierro, Inglewood, Calif., assignor to North American Rockwell Corporation, a corporation of Delaware
Filed Sept. 26, 1966, Ser. No. 581,946
Int. Cl. H02k 41/02
U.S. Cl. 310—12                         9 Claims

ABSTRACT OF THE DISCLOSURE

A linear synchronous motor having linear stator and field pole structures spaced from a relatively movable linear rotor structure having a plurality of spaced apart interdigitated salient magnetic poles providing separate excitation flux paths between the stator and field pole structures. Energization of the stator and field coils sets up a travelling stator magnetic flux field that interacts with the fixed magnetic flux field set up in the linear rotor structure by the field coil to develop a magnetomotive force between the stator and linear rotor structure.

---

The invention relates to a linear electric motor, and more particularly to a new and improved linear synchronous motor.

Linear induction motors are well known in the art. Like any induction motor, a linear induction motor has inherent disadvantages such as poor speed control, high starting current, low starting torque, low power factor, and low efficiency at low speeds. Synchronous motors are also well known in the art as constant speed machines that have no starting torque. Under the conditions of starting, the synchronous motor must operate as an induction motor.

Accordingly, it is a primary object of the invention to provide a new and improved linear synchronous motor.

It is also an object of the invention to provide a linear synchronous motor having a new and improved linear rotor.

A further object of the invention is to provide a new and improved linear synchronous motor having a high starting torque or thrust.

Another object of the invention is to provide a new and improved linear synchronous motor that can operate at variable speeds.

Yet another object of the invention is to provide a new and improved linear synchronous motor that can operate at a high efficiency even with variable air gaps.

Likewise an object of the invention is to provide a new and improved linear synchronous motor that is relatively insensitive to variable air gaps.

It is also an object of the invention to provide a linear synchronous motor that can operate at a high efficiency at all speeds.

An additional object of the invention is to provide a linear synchronous motor having increased efficiency at low speeds.

A further object of the invention is to provide a linear synchronous motor having improved speed control.

Another object of the invention is to provide a linear synchronous motor that can operate at near unity power factor.

Yet another object of the invention is to provide a new and improved linear synchronous motor that has a simplified design with attendant reliability potential at a relatively low initial cost and low maintenance cost.

Briefly, in accordance with one form of the invention, a new and improved linear synchronous motor is provided having a stator means and a field means, both cooperating with and suitably spaced from a linear rotor means having at least first and second magnetic means suitably formed to define a plurality of spaced salient magnetic poles. The first and second magnetic means are suitably positioned adjacent to and spaced from each other with the salient magnetic poles of each interdigitated so that the linear rotor means provides separate excitation flux paths between the field means and the stator means. When the field means is suitably energized to set up a fixed magnetic field in the rotor means, and the stator means is suitably energized to set up a travelling flux field that interacts with the fixed magnetic field, a magnetomotive force is developed between the stator means and the rotor means.

The new and improved linear synchronous motor can find use, for example, to propel transportation vehicles such as trains, automobiles, trucks, marine vessels, submarines, and the like. It can also find use wherever a mechanical force is required such as, for example, conveyor belts, winches, machine tools, antenna drives, and the like.

Further objects, features, and the attending advantages of the invention will become apparent when the following description is read in conjunction with the accompanying drawings in which:

FIGURE 1 is a perspective view, partly sectional, of one form of new and improved linear synchronous motor of the invention;

FIGURE 2 is a sectional view of the linear synchronous motor of FIGURE 1 along the line 2—2;

FIGURE 3 is a perspective view, partly broken away, of the linear rotor of the linear synchronous motor of FIGURE 1;

FIGURE 4 is a plan view, partly broken away, of another linear rotor for the linear synchronous motor of the invention;

FIGURE 5 is a block diagram of one form of variable speed control system for the linear synchronous motor of the invention; and FIGURE 6 is a schematic representation of typical wave forms developed by the linear synchronous motor of the invention.

Referring to FIGURE 1, one form of the linear synchronous motor 10 of the invention has a stator means 12 cooperating with a field pole means 14, both of which are spaced from a linear rotor means 16. The stator means 12 has a conventional laminated stator core 18 and stator conductor windings 20 wound thereon in suitable stator core slots. The stator means 12 is suitably positioned in a conventional manner in spaced relationship to the field pole means 14 and is not magnetically coupled to the field pole means. The stator windings are excited by alternating current and produce a magnetic wave which travels down the air gap at a velocity V proportional to the distance between adjacent stator magnetic poles (where the pole pitch is PP) and the frequency $f$ of the alternating current. Thus:

$$V = K \times f \times PP$$

where K is a constant of proportionality. Increasing the frequency or pole pitch increases the velocity of the travelling stator magnetic wave. The manner of achieving a travelling stator magnetic wave is well known in the art and is described in various textbooks, including Electrical Circuits and Machinery, Volume II, by Hehre and Harness, John Wiley & Sons, 1942, and Alternating Current Machinery by Bryant and Johnson (McGraw-Hill, 1935). Multiple individual stator coils are used and can be connected either in series or in parallel in a manner well known in the art but preferably are connected in series to form three individual phase windings excited from a three phase AC power source. In general, stator excitation is polyphase, especially three or two phase, but it may also be single phase with an auxiliary split phase winding for starting purposes. The field pole means 14 has a field frame member 22 with suitably formed field poles 24 and 26, and a field excitation coil 28 generally positioned about the central region 30 of the field frame member. It is contemplated that the field frame member as well as the field poles can have other geometrical forms than those as illustrated. Also, it is contemplated that the field excitation coil 28 can be replaced with one or more permanent magnets which would then provide field excitation flux as described hereinafter.

Referring now to FIGURE 2, the field poles 24 and 26 are generally planar in the form of linear synchronous motor illustrated. This is not critical to my invention because it is contemplated that the stator means and field pole means can have other geometrical forms. The stator 12 and the field pole means 14, i.e., laminated stator coil 18 and field poles 24 and 26, are suitably spaced from the linear rotor means 16 which is positioned substantially parallel to both the stator means and the field pole means. It is contemplated that the linear rotor means 16 can be other than planar and can be suitably formed and arranged into a curved geometry, a stepped geometry, and the like to cooperate with the stator means and the field coil means. While the linear rotor means 16 is shown by FIGURES 1 and 2 as being generally horizontal in orientation, it is contemplated that the rotor means, the cooperating stator, and field pole means can be vertically oriented or can have any desired orientation therebetween as determined by operating parameters.

Referring again to FIGURE 1, and particularly to FIGURE 3, one form of linear rotor means 16 has a first magnetic means or member 32 and a second magnetic means or member 34. Magnetic member 32 is suitably formed with a plurality of similar salient magnetic poles 36 that in the form shown are magnetically interconnected by a continuous strip portion 38 of the magnetic member 32. In the embodiment of the linear rotor means 16 as shown, the salient magnetic poles 36 are spaced apart a finite distance and extend generally outwardly from the continuous strip portion 38. The second magnetic member 34 has similar salient magnetic poles 40 that are spaced apart and are magnetically and physically interconnected by a continuous strip portion 42. In the assembled linear rotor means 16, the first magnetic member 32 and the second magnetic member 34 are preferable arranged in a common plane with the outwardly extending salient magnetic poles 36 and 40 of each interdigitated as is particularly shown by FIGURE 3. The salient magnetic poles are spaced apart so that magnetic flux leakage is substantially eliminated between adjacent interdigitated salient magnetic poles. In the form of linear rotor means, the salient magnetic poles 36 and 40 are preferably spaced apart with an isolating air gap 44 therebetween. It is also contemplated that a suitable nonmagnetic material such as a nickel-base alloy, e.g., Inconel Alloy 718, plastic, ceramic, and the like can join the salient magnetic poles 36 and 40 into a unitary linear rotor means.

Referring to FIGURE 4, another form of linear rotor means 50 has a plurality of similar salient magnetic poles 52, 54, 56, 58, 60 and 62 spaced apart a finite distance with similar isolating regions 64 therebetween that can be either an isolating air gap or a suitable nonmagnetic material. When the linear rotor means 50 cooperates with a stator means and a field coil means such as shown by FIGURE 1, adjacent salient poles will have opposite magnetic polarity that alternates from essentially full plus (north magnetic polarity) to full minus (south magnetic polarity) so that at a given point in time magnetic pole 56 could exhibit north magnetic polarity while magnetic poles 54 and 58 would exhibit south magnetic polarity. It is contemplated that the linear rotor means 50 can have the salient magnetic poles 52, 54, 56, 58, 60 and 62 interconnected by a relatively flexible or movable nonmagnetic means such as a nickel-base alloy chain, tape, and the like.

Referring now to FIGURES 1 and 5, a "fixed" magnetic field is induced by the field excitation coil 28 in the linear rotor means 16 of the linear synchronous motor 10 when the field coil is suitably energized from a conventional source of direct current 70. The field excitation circuit of the linear synchronous motor is particularly shown by FIGURE 1. The field excitation circuit can be traced by following a typical flux path 74 starting from the air gap between the field pole 24 and the linear rotor means 16. The flux path 74 crosses the field pole air gap into the continuous strip portion 38 of the first magnetic member 32 and passes through at least one of the salient magnetic poles 36 that extend outwardly from the strip portion. The flux path 74 then travels from the salient pole 36 across the stator air gap to the laminated stator core 18. In the stator laminated core 18, the flux path 74 travels through the laminated stator core and across the stator air gap to an adjacent salient magnetic pole 40 that has an opposite magnetic polarity. The flux path 74 continues to the strip portion 42 of the second magnetic member 34 and travels across the field pole air gap to field pole 26. The flux path 74 then passes through the field frame member 22 to field pole 24 which completes the field excitation circuit.

The operation of the linear synchronous motor of the invention can best be understood by referring to FIGURE 5. A commutator 76, for example, an electromagnetic commutator, functions to sense linear rotor speed and acts as a position transducer. The commutator 76 feeds the speed and position of the linear rotor to a frequency converter 78 that is supplied with either polyphase electrical power from a conventional source of alternating current such as alternator 80, or direct-current electrical power from a conventional source of direct current (not shown). When alternating current is used, alternator 80 supplies the current to the frequency converter 78 at a given frequency $f_A$. The frequency converter 78 receives the speed and position input from the commutator 76 and automatically maintains an applied stator frequency $f_m$ that satisfies the relationship $f_m = kPN$, where $k$ is a constant of proportionality, P is the number of poles, and N is rotor speed. When direct current is supplied, the converter 78 changes the direct current to alternating current at the applied stator frequency $f_m$. The frequency converter 78 applies the variable frequency $f_m$ to the stator means of the linear synchronous motor 10 so that the stator means sets up a travelling magnetic wave that substantially matches the linear velocity of the fixed field magnetic wave that is set up by the field excitation coil of the linear synchronous motor. In accordance with known electromagnetic principles, the stator magnetic wave and the field magnetic wave are then stationary with respect to one another and are separated by a displacement angle or phase angle designated delta ($\delta$). The linear synchronous motor 10 of the invention develops a desired "torque" or thrust because the stator and field magnetic waves attempt to align. When the stator magnetic wave leads the field magnetic wave, the desired magnetomotive force or thrust is developed between the stator and the rotor of the linear synchronous motor 10. The cooperation between the commutator 76 and the frequency converter 78 can also be used to develop a desired motor operation at a selected unity, leading or lagging power factor.

The travelling flux field or stator magnetic wave and the fixed flux field or field magnetic space wave are shown by FIGURE 6 in a simplified sinusoidal form. The travelling flux field or stator wave 84 and the fixed flux field or field wave 86 combine electrically to form a resultant wave 88. The resulting magnetomotive force or thrust T is proportional to the product of the amplitude of the resultant wave 88 which represents resultant flux $\phi_R$, the magnetomotive force F of the field wave 86, and the sine of the displacement angle $\delta_{RF}$ between the resultant flux $\phi_R$ and the field magnetomotive force F which is essentially constant and slightly less than 90 electrical degrees. This yields the relationship $$T = k\phi_R F \sin \delta_{RF}$$

This relationship results when the stator wave 84 and the field wave 86 are maintained substantially stationary with respect to one another.

The field magnetomotive force F and the resultant flux $\phi_R$ are directly related to the field voltage $E_g$ and the stator terminal voltage $V_t$. Thus, the displacement angle $\delta_{RF}$ (see FIGURE 6) is maintained substantially constant at any speed or frequency. This is true not only at all positive values of speed and frequency but also at the zero or starting condition of the linear synchronous motor. At zero speed, the frequency is reduced to zero, i.e., essentially direct-current excitation. However, at zero speed the commutator 76 still senses the speed and position of the linear rotor and there is still a polyphase electrical power input to the frequency converter 78. The stator current distribution and magnetic wave 84 along the air gap of the stator is still approximately sinusoidal and displaced in space from the field magnetic wave 86 by approximately 90 electrical degrees (or other selected angle). Thus, at zero speed, the stator wave 84 and the field wave 86 are again stationary with respect to each other and separated by a finite displacement. The conditions for positive thrust are, therefore, satisfied and the desired starting magnetomotive force or thrust results.

A reversal of the linear synchronous motor of the invention is possible by a simple reversal of the field excitation current from the field supply 70 to the field excitation coil 28. It is contemplated, that the stator means and field pole means of the linear synchronous motor of the invention can be stationary or fixed so that the linear rotor means is movable.

As will be evidenced from the foregoing description, certain aspects of the invention are not limited to the particular details of construction as illustrated. It is contemplated that other modifications and applications will occur to those skilled in the art. Accordingly, it is intended that the appended claims shall cover such modifications and applications that do not depart from the true spirit and scope of the invention.

I claim:
1. A linear synchronous motor comprising:
 (a) stator means providing a travelling magnetic flux field,
 (b) field pole means in fixed relation to said stator means for providing a magnetic flux path,
 (c) field coil means on said field pole means for providing a fixed magnetic flux field, and
 (d) linear rotor means spaced from said stator means and said field pole means, said linear rotor means comprising:
  (1) a plurality of spaced-apart magnetic means,
  (2) adjacent ones of said magnetic means exhibiting opposite magnetic polarity, and
  (3) magnetic interconnecting means joining said magnetic means having like magnetic polarity, so that said linear rotor means provides at least one field excitation path for said fixed magnetic flux field between said field pole means and said stator means, said fixed magnetic flux field and said travelling magnetic flux field interacting and developing a magnetomotive force or thrust between said stator means and said rotor means.

2. The linear synchronous motor of claim 1 in which said magnetic means are a plurality of spaced-apart salient pole pieces.

3. The linear synchronous motor of claim 1 in which said stator means is suitably energized from a polyphase power source and said field coil means is suitably energized from a direct-current power source.

4. A linear synchronous motor comprising:
 (a) stator means providing a travelling magnetic flux field,
 (b) field means providing a fixed magnetic flux field, and
 (c) linear rotor means spaced from said stator means and said field means for providing separate field excitation paths for said fixed magnetic flux field between said field means and said stator means, said fixed magnetic flux field and said travelling magnetic flux field interacting and developing a magnetomotive force or thrust between said stator means and said linear rotor means.

5. The linear synchronous motor of claim 4 in which said linear rotor means comprises:
 (a) at least first and second magnetic members exhibiting opposite magnetic polarity,
 (b) each of said first and second magnetic members suitably formed to define a plurality of spaced-apart and magnetically interconnected salient magnetic pole pieces,
 (c) said first magnetic member positioned adjacent to and spaced from said second magnetic member, and further positioned with said salient magnetic pole pieces of said first magnetic member interdigitated with said salient magnetic pole pieces of said second magnetic member.

6. A linear rotor for a linear synchronous motor, said linear rotor comprising:
 (a) at least first and second magnetic members exhibiting opposite magnetic polarity,
 (b) said first magnetic member positioned adjacent to and spaced from said second magnetic member, and further positioned with said magnetic pole pieces of said first magnetic member interdigitated with said magnetic pole pieces of said second magnetic member so that said rotor means provides separate field excitation paths.

7. The linear rotor of claim 6 in which each of said first and second magnetic members are suitably formed to define a plurality of spaced-apart and magnetically interconnected salient magnetic pole pieces.

8. The linear synchronous motor of claim 4 in which said field means comprises a U-shaped structure having leg members normal to and spaced from said linear rotor means and field coil means wound on said U-shaped structure.

9. The linear synchronous motor of claim 8 in which said stator means is fixedly contained within said field means U-shaped structure and magnetically isolated therefrom.

References Cited

UNITED STATES PATENTS

| | | | |
|---|---|---|---|
| 3,265,911 | 9/1966 | Madsen | 310—12 |
| 3,283,191 | 11/1966 | Carruth | 310—263 XR |
| 3,271,606 | 9/1966 | Collins | 310—263 |
| 2,944,160 | 7/1960 | Dickinson | 310—15 XR |
| 3,151,285 | 9/1964 | Rainey | 310—13 XR |
| 2,831,131 | 4/1958 | Klotz | 310—13 |
| 3,238,397 | 3/1966 | Maness | 310—27 |
| 2,981,855 | 4/1961 | Lieshout et al. | 310—162 XR |
| 2,302,983 | 11/1942 | Swallow | 310—27 |

MILTON O. HIRSHFIELD, Primary Examiner

B. A. REYNOLDS, Assistant Examiner

U.S. Cl. X.R.

318—135